Feb. 11, 1936. O. AUSTIN 2,030,042
APPARATUS FOR DECORATING OBJECTS
Filed Dec. 10, 1934 2 Sheets-Sheet 1
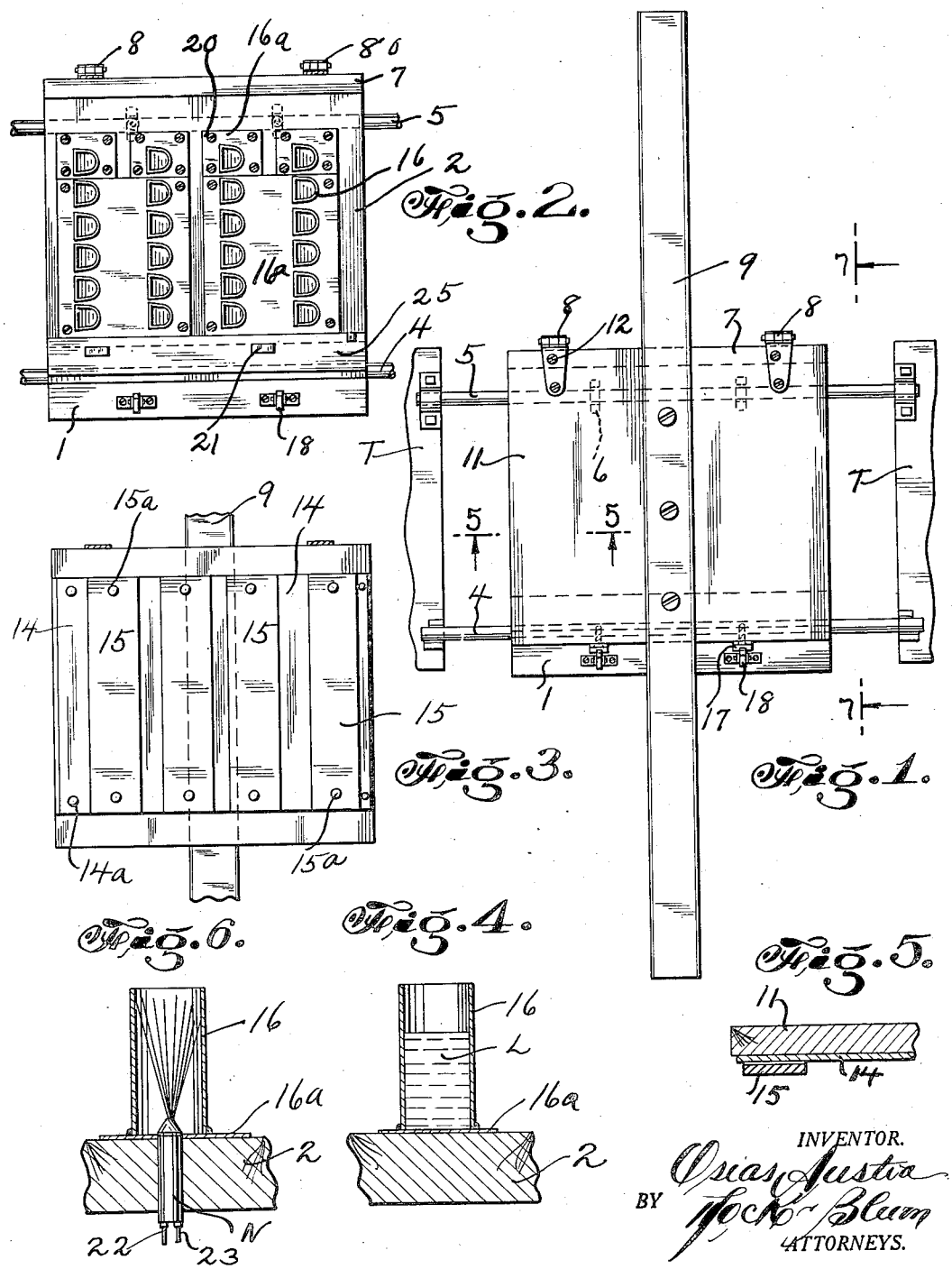

Feb. 11, 1936.     O. AUSTIN     2,030,042
APPARATUS FOR DECORATING OBJECTS
Filed Dec. 10, 1934     2 Sheets-Sheet 2
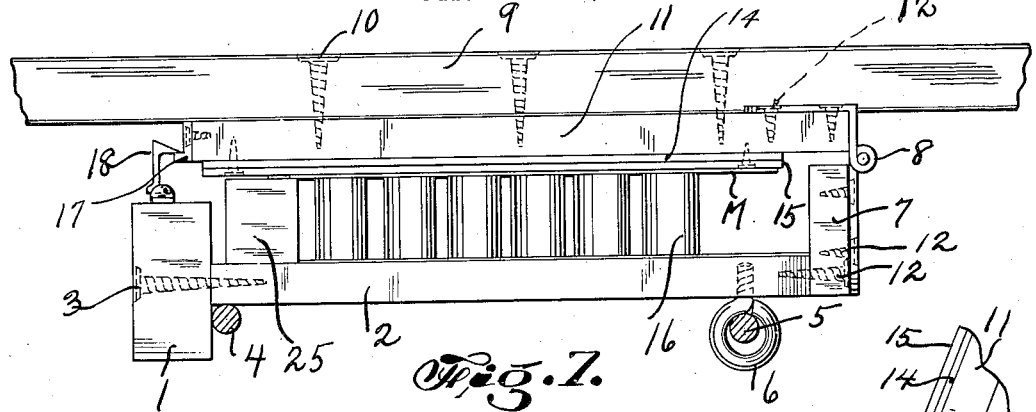
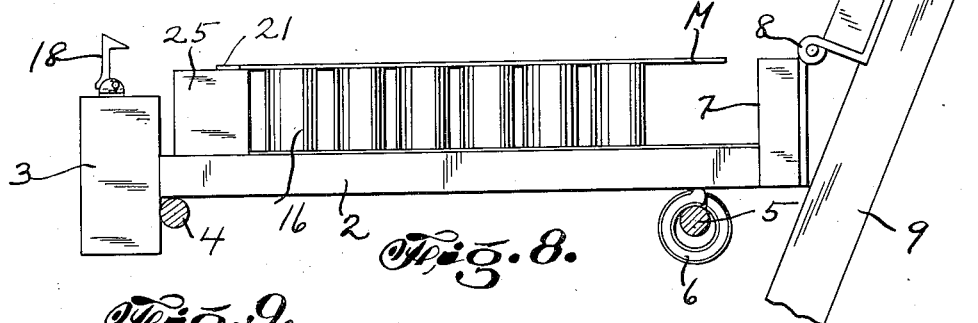
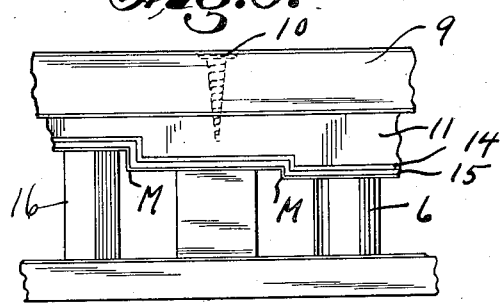
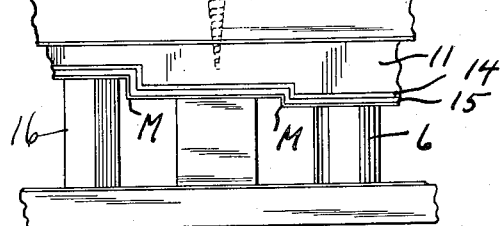
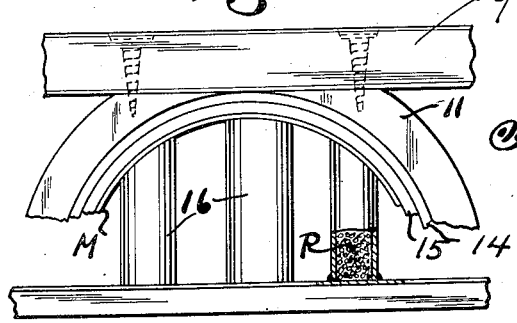
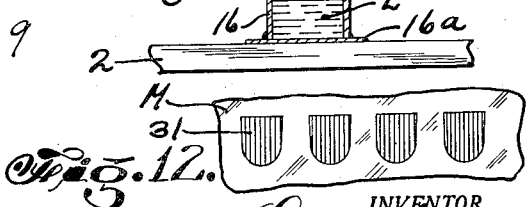

Patented Feb. 11, 1936

2,030,042

UNITED STATES PATENT OFFICE 2,030,042

APPARATUS FOR DECORATING OBJECTS

Osias Austin, Brooklyn, N. Y.

Application December 10, 1934, Serial No. 756,804

3 Claims. (Cl. 41—1)

My invention relates to a new and improved method of, and to a new and improved apparatus for decorating objects.

One of the objects of my invention is to provide a new and improved method and mechanism for decorating sheets of "Cellophane", glass, cloth, wood, cardboard, celluloid, cellulose acetate, pyroxylin materials, and any other material, transparent or non-transparent.

Another object of my invention is to provide an improved method and apparatus for decorating planar and nonplanar sheets or bodies of material.

Another object of my invention is to decorate any material, in any suitable shape, by means of a liquid, a powder, or the like. The decorative material may be glass beads, metallic or glass flakes, or particles of any size or shape, including particles of wool, silk, etc. The decorating liquid may contain coloring matter either in dissolved or in pigment or powder form. Likewise, the invention extends to the idea of providing a suitable adhesive upon the object to be decorated, according to the desired pattern, and then causing ornamental particles to cling to the area to which the adhesive has been applied. For example, the adhesive could be used for connecting particles of colored wool, particles of silk, or any other decorative material, to the object to be decorated. Likewise, I could use metal or glass in powdered form for said purpose.

Another object of my invention is to provide simple and efficient apparatus for carrying out said invention.

Other objects of my invention will be set forth in the following description and drawings.

Fig. 1 is a top plan view of the apparatus which can be used for carrying out my invention.

Fig. 2 is a top plan view of the receptacles which contain the material which is to be applied to the object to be decorated, together with the supporting means for said receptacles.

Fig. 3 is a bottom plan view of the cover member which is used in the apparatus.

Fig. 4 is a detail sectional view showing one of the receptacles and the support therefor, Fig. 5 is a sectional view on the line 5—5 of Fig. 2.

Fig. 6 is a sectional view which is generally similar to Fig. 4, and showing a modification of the invention.

Fig. 7 is a sectional view on the line 7—7 of Fig. 1.

Fig. 8 is a view which is similar to Fig. 7, save that Fig. 7 shows the cover in the closed position, and Fig. 8 shows said cover member in the open position.

Fig. 9 is a view generally similar to Fig. 7, and showing a modification of the invention.

Fig. 10 is a view generally similar to Fig. 9, and showing another modification of the invention.

Fig. 11 is a view which is generally similar to Fig. 9, and showing another modification of the invention.

Fig. 12 is a plan view showing the decorated object.

As shown in Fig. 7, the liquid or solid matter which is to be deposited upon the object to be decorated, is located with a number of containers 16. These containers are arranged according to the pattern of the decoration, and the said containers have outlines corresponding to the individual elements of the desired pattern. In the annexed drawings I have shown a simple pattern, having simple pattern elements, but said members 16 could have any desired outline, and they could be arranged in any manner whatever. As shown in Fig. 4, each said receptacle 16 is provided with a base member 16a. Each base member 16a can be connected to the bottom support 2, by means of tacks or other fastening members 20. As shown in Fig. 2, any desired number of said receptacles 16 could be located upon a single base, and if desired, any one or more of said receptacles 16 could be provided with an individual base or individual bases, in order to permit the receptacles 16 to be arranged in any desired manner.

As shown in Fig. 8, the piece of material M which may be decorated, is placed upon the tops of the receptacles 16. In this particular embodiment, the piece of material which is to be decorated is planar, and the tops of the receptacles 16 are all located in the same plane. Said piece of material M can be "Cellophane" or any other material, which may either absorb the decorative material, or be impervious to said decorative material. In the latter case, the decorative material forms a surface layer upon the piece of material M.

The member 2 is provided with an upright 25, upon which one or more lugs 21 are located. Usually three or more said lugs 21 are provided. These lugs 21 serve as markers, against which two adjacent edges of the sheet of material can be located, in order to locate said sheet of material with reference to the receptacles 16.

The member 2 is likewise provided with another upright 7, which is connected to said member 2 by means of screws 12. Said screws 12 also serve to connect a hinge 8 to said upright 7. The member 11 is connected to the hinge or hinges 8. Any desired number of said hinges 8 may be utilized.

The element or member 11, can be made of any suitable rigid or resilient or compressible material. It can have a lever 9 attached thereto. Said member 11 may be made of wood or metal, which is rigid and non-compressible. The member 11 is connected to the lever 9, by means of screws or other fastening members 10.

The under side of the member 11 is provided with members 14, which can be made of any suitable compressible material such as paper or cardboard, felt or cork. Said members 14 are connected to member 11, by means of fastening members 14a. The under side of each member 14 is provided with a member 15, which can be made of resilient and compressible rubber, such as sponge rubber, and which is held in position by fastening members 15a. Members 15 can be made of any suitable resilient material other than sponge rubber, such as solid rubber.

When the lever or clamping member 9 is forced into the position shown in Fig. 7, the resilient members 15 clamp the sheet of material M against the upper edges of the receptacle 16, in a liquid-tight manner. The parts are maintained in the position shown in Fig. 7, by means of hooks 18, said hooks 18 being connected to an upright 1, said upright 1 being connected to the member 2 by means of screws or other fastening members 3.

The hooks or catches 18 engage angle members 17, which are suitably secured to the member 11.

Any suitable springs (not shown) hold the hooks or catches 18 in the operative position which is shown in Fig. 7, so that the sheet of material M is held firmly pressed against the top edges of the receptacles 16.

Referring to Fig. 2, the underside of the member 2 rests against a rod 4, which is removably held upon the table members T. The underside of the member 2 is likewise provided with one or more eyes 6, and a rod 5 passes through said eyes 6, and said rod 5 is suitably held upon said table members T.

After the parts have been moved to the position shown in Fig. 7, the rod 4 can be removed, and the apparatus can then be rocked or turned, or it can be both rocked and turned, about the rod 5.

The receptacles 16 are partially filled with liquid L, as shown in Fig. 4, or said receptacles can be filled with any other material which is to be applied to a face of the sheet of material M. The effect of the vigorous rocking and turning is to throw the liquid L, or other material against the face of the sheet of material M. Any spreading of said liquid L, or other material, beyond the edges of the receptacles 16, is prevented because the sheet of material M tightly seals the open mouths of said receptacles 16. The liquid L is therefore either absorbed by the sheet of material M, or it forms an adherent surface pattern upon the sheet of material M. As previously stated, any suitable coloring matter can be dissolved in the liquid L, or said coloring matter, in insoluble form, can be intermixed with the liquid L. The choice of the coloring matter, or of the paint or adhesive which is to be applied, depends upon the material which is being decorated.

After the moist pattern has thus been formed upon the sheet of material, said sheet is removed from the receptacles 16, and the volatile ingredients of the liquid L are allowed to evaporate, thus fixing the pattern upon the sheet of material M. Any suitable supplemental steps can be utilized for fixing the pattern which has thus been formed, upon the sheet of material M, depending upon the material which is used for making the decoration, and depending upon the particular material which is being decorated. If the material L is an adhesive, it forms the desired pattern upon the sheet of material M, and any suitable decorative material can then be connected to the separated layers of adhesive which have thus been applied to the sheet of material M. This can be done by spreading or blowing the decorative material upon the sheet of material, and causing the decorative sheet of material to adhere to the areas to which adhesive has been applied. The adhesive can then be dried.

Figs. 9 and 10 show how the invention can be applied to the decoration of a sheet of material M which is of non-planar shape. Fig. 10 also shows how a powdered material, can be located in the receptacle 16, said powdered material having suitable adhesive properties, so that it can cling to the adjacent space of the sheet of material M. For this purpose I may mix the powdered material with a suitable adhesive. However, the adhesive may be applied to the material M, according to the desired patterns, by a printing operation, or in any other manner, prior to using the device shown.

As shown in Fig. 11, the invention may be applied to decorating a sheet of glass G, or other rigid material which cannot form a tight seal with the mouths of the receptacles 16. In such case I provide the mouth of each receptacle 16 with an extension 30 which is made of rubber or any other suitable resilient and compressible material.

As shown in Fig. 6, the material may be applied by means of an air-brush N. Liquid or the like is supplied to the air-brush N by means of the pipe 22, and air or other gas under suitable pressure is supplied to the air-brush N through the pipe 23. Said air-brush N can be of any suitable type, as the illustration in Fig. 6 is conventional. In such case the receptacles 16 serve to confine the sprayed material which is to be applied to the member M. In using the apparatus which is shown in Fig. 1 said apparatus can be continuously and rapidly or slowly turned in the same direction, any desired number of times, so that the receptacles 16 will be repeatedly inverted, and they will also repeatedly assume the upright position which is shown in Fig. 4 for example. Said receptacles 16 can also be held in the inverted position for any suitable period. By means of said vigorous rocking and turning, the liquid or the like is thrown against the surface to be decorated in the form of drops, and the surface to be decorated is also subjected to the contact and impact of the liquid or the like, while said liquid or the like is in the form of a solid mass.

I prefer to use the apparatus shown in Figs. 1, 2 and 3, in preference to the spray device which is shown in Fig. 6. In using the apparatus shown in Fig. 6, each receptacle 16 may be provided with any suitable outlet, so that the sprayed material will not accumulate therein. If such outlet is not provided, the material which is being sprayed rapidly accumulates in each receptacle 16, so that said material is first sprayed in atomized form, and the material then fills up each receptacle 16, so that it is applied under any suitable pressure and in the form of a solid mass, against the sheet of material which is being decorated. As shown in Fig. 12, decorated areas 31 are formed on the material M. The respective receptacles can have decorative material of different kinds and colors. The receptacles 16 can be connected to any suitable reservoir or reservoirs.

In order to form the design of a flower, or any other design in which the pattern elements abut each other, two or more of the receptacles could have a common wall, having a thin and sharp top edge, so that the pattern elements which are applied substantially touch each other. This is particularly important when particles of solid material are to be applied.

I have described preferred embodiments of my invention, but it is clear that numerous changes and omissions can be made without departing from its spirit, and I do not wish to be limited to the details previously mentioned.

I claim:

1. In combination, a turnably mounted base, receptacles mounted in said base in a desired pattern, clamping means which include packing means, for clamping an object to the mouths of said receptacles, said clamping means being connected to the base.

2. In combination, a turnably mounted base, receptacles mounted in said base in a desired pattern, clamping means which include packing means, for clamping an object to the mouths of said receptacles, said clamping means being connected to the base, the mouths of said receptacles arranged in different planes, said clamping means having a contour which corresponds to the locations of said mouths.

3. In combination, a turnably mounted base, receptacles mounted on said base in a desired pattern, said receptacles having mouths provided with packing rings, clamping means connected to the base and adapted to clamp an object against said packing rings.

OSIAS AUSTIN.